United States Patent
Zhang

(10) Patent No.: US 9,971,098 B2
(45) Date of Patent: May 15, 2018

(54) COUPLER AND OPTICAL WAVEGUIDE CHIP APPLYING THE COUPLER

(71) Applicants: Hisense Broadband MultiMedia Technologies Co., Ltd., Qingdao, Shandong (CN); Hisense USA Corp., Suwanee, GA (US); Hisense International Co., Ltd., Qingdao, Shandong (CN)

(72) Inventor: Hua Zhang, Shandong (CN)

(73) Assignees: Hisense Broadband Multimedia Technologies Co., Ltd., Qingdao (CN); Hisense USA Corp., Suwanee, GA (US); Hisense International Co., Ltd., Qingdao (CN)

( * ) Notice: Subject to any disclaimer, the term of this patent is extended or adjusted under 35 U.S.C. 154(b) by 0 days. days.

(21) Appl. No.: 15/467,044

(22) Filed: Mar. 23, 2017

(65) Prior Publication Data
US 2017/0192178 A1    Jul. 6, 2017

Related U.S. Application Data

(63) Continuation of application No. 14/981,420, filed on Dec. 28, 2015, now Pat. No. 9,645,320.

(30) Foreign Application Priority Data

Mar. 30, 2015 (CN) .......................... 2015 1 0141822
Mar. 30, 2015 (CN) .......................... 2015 1 0145773

(51) Int. Cl.
*G02B 6/34* (2006.01)
*G02B 6/30* (2006.01)
*G02B 6/124* (2006.01)

(52) U.S. Cl.
CPC .............. *G02B 6/34* (2013.01); *G02B 6/124* (2013.01); *G02B 6/30* (2013.01); *G02B 6/305* (2013.01)

(58) Field of Classification Search
None
See application file for complete search history.

(56) References Cited

U.S. PATENT DOCUMENTS 7,260,293 B1    8/2007 Gunn, III et al.
8,781,276 B2 *  7/2014 Fattal ................. G02B 6/02061
                                                    385/37

(Continued)

FOREIGN PATENT DOCUMENTS

CN      103890624 A       6/2014
WO      WO 2013058769 A1  4/2013

OTHER PUBLICATIONS

A First Office Action to Chinese Application No. 201510141822.6, dated Sep. 22, 2017 and English translation (12p).

*Primary Examiner* — Sung Pak
(74) *Attorney, Agent, or Firm* — Brinks Gilson & Lione

(57) ABSTRACT

A coupler and a waveguide chip including the coupler are provided. The coupler connects a first optical waveguide to a second optical waveguide and includes an entity region and a first waveguide grating. A first end of the entity region is coupled to the first optical waveguide. A second end of the entity region is coupled to a second end of the first waveguide grating. A first end of the first waveguide grating is coupled to the second optical waveguide. Size of the first end of the entity region matches size of an end plane of the first optical waveguide, size of an end plane of the second end of the entity region matches size of an end plane of the second end of the first waveguide grating, and size of the (Continued)

first end of the first waveguide grating matches size of an end plane of the second waveguide.

25 Claims, 9 Drawing Sheets

(56) References Cited

U.S. PATENT DOCUMENTS

| | | |
|---|---|---|
| 9,435,961 B2 | 9/2016 | Jiang |
| 2004/0156589 A1 | 8/2004 | Gunn, III et al. |
| 2009/0290837 A1 | 11/2009 | Chen et al. |
| 2010/0092128 A1* | 4/2010 | Okayama ............... G02B 6/102 385/14 |
| 2014/0314374 A1 | 10/2014 | Fattal et al. |
| 2015/0309261 A1 | 10/2015 | Kobyakov et al. |
| 2016/0109659 A1 | 4/2016 | Jiang |

* cited by examiner

COUPLER AND OPTICAL WAVEGUIDE CHIP APPLYING THE COUPLER

CROSS-REFERENCE TO RELATED APPLICATION

This application is a continuation under 35 U.S.C. § 120 of U.S. application Ser. No. 14/981,420 filed on Dec. 28, 2015, pending, which claims priority to Chinese Patent Application No. 201510145773.3, filed on Mar. 30, 2015, and Chinese Patent Application No. 201510141822.6, filed on Mar. 30, 2015. Each of the aforementioned applications is hereby incorporated by reference in their entireties.

TECHNICAL FIELD

The present disclosure relates to the fiber communications field, and in particular, to a coupler and an optical waveguide chip applying the coupler.

BACKGROUND

In recent years, with rapid development of various Internets and multi-media applications, traffic in a communications network is growing rapidly. An access network, a metropolitan area network, and a backbone transmission network all have a growing requirement on device upgrade, so as to meet a growing network traffic requirement. An optical sending and receiving module is a core unit of an optical network. The optical sending and receiving module characterized by small form factor, low power consumption, multi-channel, and low cost becomes a development trend. As core components of the optical sending and receiving module, an optical transmitting assembly and an optical receiving assembly also must be developed to be characterized by small form factor and multi-channel. An integrated encapsulating technology may realize small form factor of a multi-channel optical assembly, that is, encapsulating a multi-channel laser chip or a detector chip into a same tube shell. In the optical assembly, besides the laser chip and the detector chip, some passive components are also required to implement a passive processing function of an optical signal such as dividing optical power into multi-channel signals, wavelength division multiplexing/de-multiplexing, polarization state combining and separating, and the like, so as to constitute a complete optical transmitting assembly function or optical receiving assembly function. The passive component may be classified into two types: one type is based on free space optics, that is, a light beam is propagated in air or other uniform mediums; and another type is based on waveguide optics, that is, a light beam is propagated in an optical waveguide. Each of the two types of passive components has advantages and disadvantages. For a small-form-factor optical assembly with more than four channels, the passive component based on a planar optical waveguide chip has an advantage over the passive component based on free space optics.

For a pigtail optical transmitting assembly and a pigtail optical receiving assembly, coupling a single-mode fiber and the passive component is one of key technologies. If the passive component uses the planar optical waveguide chip, how to reduce insertion loss between the single-mode fiber and an input/output optical waveguide is a difficulty faced by many developers. Diameter of a core region of the single-mode fiber is 9 micron, while size of a core layer of a single-mode optical waveguide is much smaller, for example, 4 micron×4 micron. A difference between speckle sizes of the single-mode fiber and the single-mode optical waveguide results in very large insertion loss, for example, reaching 2 dB. For the optical transmitting assembly or the optical receiving assembly, such insertion loss cannot be accepted.

In order to reduce the insertion loss between the fiber and the waveguide, a solution is provided so that an entity coupler of which renders a narrower (wider) linear gradient is used to reduce the insertion loss between the fiber and the waveguide. Since a manufacturing process of the coupler is planarization, an advantage of the coupler is simple design and a disadvantage is that size of a light spot is adjusted only transversely (horizontally) but cannot be adjusted vertically. Therefore, the light spot size of the single-mode waveguide cannot be made to close to the light spot size of the single-mode fiber. The coupler has a certain effect on an optical waveguide with a low refraction index difference, while the coupler has a non-obvious effect on an optical waveguide with a high refraction index difference. Therefore, the insertion loss during coupling optical waveguide signals on two sides of the coupler cannot be reduced significantly.

SUMMARY

Embodiments of the present disclosure provide a coupler and an optical waveguide chip applying the coupler, which may significantly reduce insertion loss during coupling optical waveguide signals on two sides of the coupler.

In one aspect, a coupler is provided, where the coupler is configured to connect a first optical waveguide to a second optical waveguide, and the coupler includes an entity region and a first waveguide grating; a first end of the entity region is coupled to the first optical waveguide; a second end of the entity region is coupled to a second end of the first waveguide grating; a first end of the first waveguide grating is coupled to the second optical waveguide. Size of the first end of the entity region matches size of an end plane of the first optical waveguide, size of an end plane of the second end of the entity region matches size of an end plane of the second end of the first waveguide grating, and size of the first end of the first waveguide grating matches size of an end plane of the second optical waveguide. Width of the entity region renders a linear gradient from the first end of the entity region to the second end of the entity region.

In another aspect, an optical waveguide chip is provided, which includes a coupler and a first optical waveguide coupled to the coupler, where the coupler is the foregoing coupler.

The coupler provided in the embodiment of the present disclosure connects the first optical waveguide to the second optical waveguide, and the size of the first end of the entity region matches the size of the end plane of the first optical waveguide, the second end of the entity region matches the size of the end plane of the second end of the first waveguide grating, and the size of the first end of the first waveguide grating matches the size of the end plane of the second optical waveguide; because the width of the entity region renders the linear gradient from the first end of the entity region to the second end of the entity region, the entity region of the coupler may adjust size of a light spot output by the first optical waveguide to close to size of a light spot of the second optical waveguide along a horizontal direction, and a refraction index difference between a core layer and cladding in a core region of the first waveguide grating restricts light transmission; however, because a gap region of the first waveguide grating is a uniform medium, light may propagate divergently, that is, adjusting the size of the light spot output by the first optical waveguide in horizontal and vertical directions to close to the size of the light spot of the second optical waveguide. As a result, insertion loss during coupling optical waveguide signals at two sides of the coupler may be significantly reduced.

BRIEF DESCRIPTION OF THE DRAWINGS

To illustrate the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

REFERENCE NUMERAL

Figure 1:
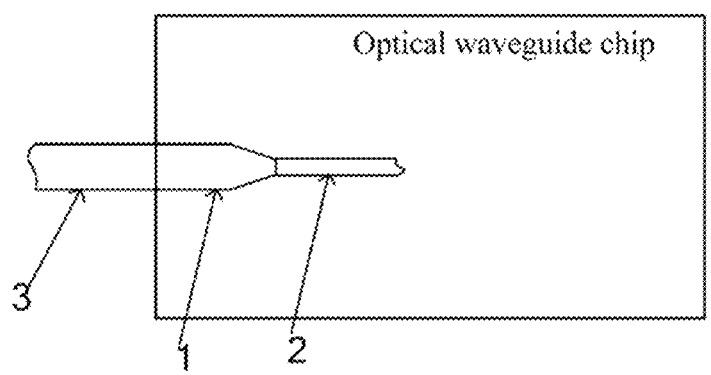
FIG. 1 is a schematic structural diagram of an optical waveguide chip according to an embodiment of the present disclosure.

Coupler-1;
Optical waveguide-2;
Fiber-3;
Entity region-11;
First end of the entity region-111;
Second end of the entity region-112;
First waveguide grating-12;
First end of the first waveguide grating-121;
Second end of the first waveguide grating-122;
Second waveguide grating-13;
First light spot zoom region-M;
Second light spot zoom region-N;
First medium-501;
Second medium-502;
Third medium-503; and
Fourth medium-504.

DETAILED DESCRIPTION OF THE DRAWINGS

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. section 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the description of the present disclosure, it should be understand that positions and positional relationships indicated by the terms such as "center", "above", "below", "in front of", "behind", "left", "right", "vertical", "horizontal", "top", "bottom", "inside", "outside" are based on the position or positional relationship shown in the accompany drawings, which are used only for convenient and brief description, and do not indicate or imply that the indicated apparatus or element must be in a specific position, and must be constructed and operated in a specific position. In addition, in embodiments of the present disclosure, an inner end and an outer end are both defined according to directions of signals in a transmission path, that is, according to directions of signals in a transmission path, one end for inputting signals is defined as the outer end or a signal input end of the transmission path, and another end for outputting signals is defined as the inner end or a signal output end. Of course, other names may be defined according to principles, and thus the foregoing cannot be understood as a limitation on the present disclosure.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the description of the present disclosure, it should be understood that an orientation or a positional relationship indicated by a term such as "center", "left", "right", "vertical", "horizontal", and the like is based on an orientation or a positional relationship shown in an accompany drawing, which is only used for convenient and brief description, and do not indicate or imply that the apparatus or element referred to must have a particular orientation, and must be constructed and operated in a particular orientation. In addition, in embodiments of the present disclosure, an input end and an output end are both defined according to a direction of a signal, that is, according to a signal direction, where an end for inputting a signal is defined as the input end, and an end for outputting a signal is defined as the output end. Of course, other names may be defined according to principles, and thus the foregoing cannot be understood as a limitation to the present disclosure.

An embodiment of the present disclosure provides an optical waveguide chip, which includes a coupler 1, a first optical waveguide 2 coupled to the coupler 1, and as shown in FIG. 1, one end of the coupler 1 is coupled to the first optical waveguide 2 on the optical waveguide chip, and another end of the coupler 1 is coupled to a second optical waveguide 3. The optical waveguide chip is usually a signal processing unit at an end of a network and is mainly configured to perform a processing such as further decoding, optical-to-electrical conversion, and the like on an optical signal received by the first optical waveguide 2, or perform coding and electrical-to-optical conversion on an electrical signal to obtain an optical signal and then send the optical signal by the first optical waveguide 2. However, when optical signals propagate in an optical medium, the optical signals are distinguished based on modes, and because a basic signal processing unit at the end of the optical network mainly performs a processing based on a single-mode optical signal, the present solution is mainly applied to transmitting the single-mode optical signal through a single-mode optical waveguide by the optical waveguide chip. In the present application, the optical waveguide chip is usually a planar optical waveguide chip, and the first optical waveguide 2 and the second optical waveguide 3 configured to transmit a signal are single-mode optical waveguides. When located on the optical waveguide chip, the coupler 1 and the first optical waveguide 2 usually may be manufactured or molded on a same planar optical waveguide medium with certain thickness, so that as shown in FIG. 1 and FIG. 2, an overlook section of the first optical waveguide 2 is usually a strip with certain width, and an overlook section of the coupler 1 is usually a trapezoid; and the second optical waveguide 3 is configured to input an optical signal to the coupler 1 or receive an optical signal output by the coupler 1, so the second optical waveguide 3 is usually a fiber, and the following embodiments are described based thereon.

Figure 2:
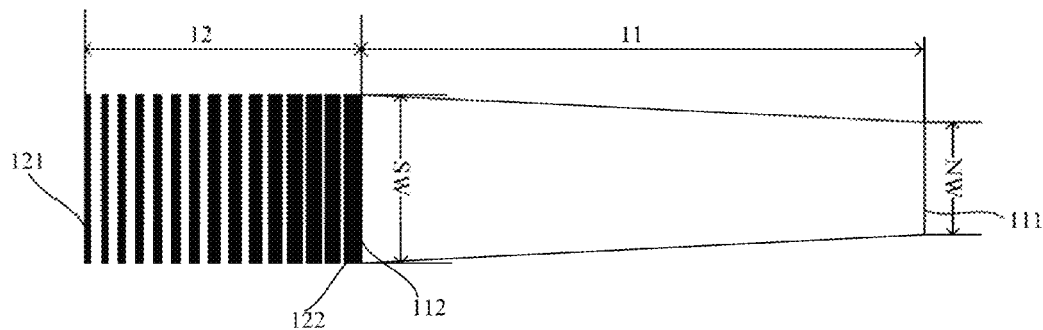
FIG. 2 is a schematic structural diagram of a coupler according to an embodiment of the present disclosure.

As shown in FIG. 2, an embodiment of the present disclosure provides a coupler 1 applied to the foregoing optical waveguide chip. The coupler 1 is configured to connect the first optical waveguide 2 to the second optical waveguide 3 and includes an entity region 11 and a first waveguide grating 12;

a first end 111 of the entity region 11 is coupled to the first optical waveguide 2;

a second end 112 of the entity region 11 is coupled to a second end 122 of a first waveguide grating 12;

a first end 121 of the first waveguide grating 12 is coupled to the second optical waveguide 3;

where size of the first end 111 of the entity region 11 matches size of an end plane of the optical waveguide 2, and size of an end plane of the second end 112 of the entity region 11 matches size of an end plane of the second end 122 of the first waveguide grating 12, and width of the first end 121 of the first waveguide grating 12 matches diameter of fiber 3; and width of the entity region 11 renders a linear gradient from the first end 111 of the entity region 11 to the second end 112 of the entity region 11.

In the foregoing embodiment, the size of the first end 111 of the entity region 11 matches the size of the end plane of the first optical waveguide 2 refers to that: the size of the first end 111 of the entity region 11 is exactly the same as the size of the end plane of the first optical waveguide 2 so that the first end 111 of the entity region 11 may be completely coupled to the end plane of the first optical waveguide 2, or a difference between the size of the first end 111 of the entity region 11 and the size of the end plane of the first optical waveguide 2 is within a set range so that insertion loss caused during coupling the first end 111 of the entity region 11 and the size of the end plane of the first optical waveguide 2 is minimized. Similarly, the size of the end plane of the second end 112 of the entity region 11 matches the size of the end plane of the second end 122 of the first waveguide grating 12 refers to that: the size of the end plane of the second end 112 of the entity region 11 is exactly the same as the size of the end plane of the second end 122 of the first waveguide grating 12 so that the end plane of the second end 112 of the entity region 11 may be completely coupled to the end plane of the second end 122 of the first waveguide grating 12, or a difference between the size of the end plane of the second end 112 of the entity region 11 and the size of the end plane of the second end 122 of the first waveguide grating 12 is within a set range so that insertion loss caused during coupling the second end 112 of the entity region 11 and the end plane of the second end 122 of the first waveguide grating 12 is minimized. Size of the first end 121 of the first waveguide grating 12 matches size of an end plane of the second optical waveguide 3 refers to that: the size of the first end 121 of the first waveguide grating 12 is exactly the same as the size of the end plane of the second optical waveguide 3, and of course, when the second optical waveguide 3 is a round fiber, the width of the first end 121 of the first waveguide grating 12 is the same as diameter of the second optical waveguide 3, or a difference between the width of the first end 121 of the first waveguide grating 12 and the diameter of the second optical waveguide 3 is within a set range, so that insertion loss caused during coupling the first end 121 of the first waveguide grating 12 and the second optical waveguide 3 is minimized.

Figure 3:
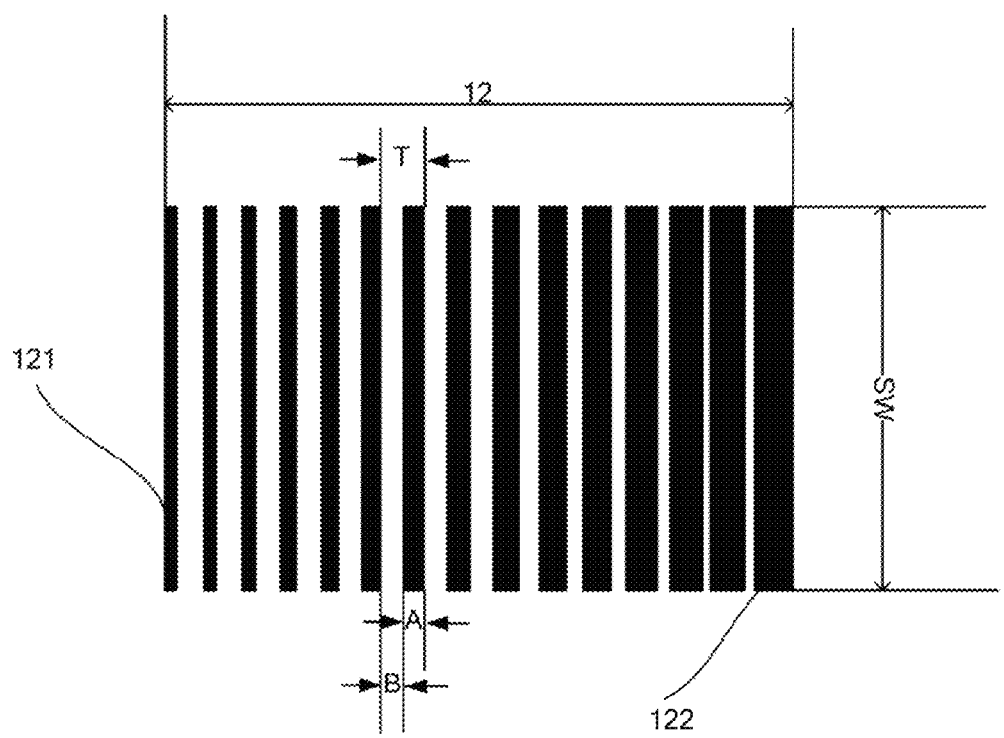
FIG. 3 is a schematic structural diagram of a first waveguide grating of the coupler according to an embodiment of the present disclosure.

The first waveguide grating 12 includes at least one grating period, where each grating period consists of a core region and a gap region. As shown in FIG. 3, a grating period T includes a region A and a region B, where the region A is the core region and the region B is the gap region, and a length ratio between the region A and the grating period T is a duty cycle of the grating period T. Structure of the region A is similar to that of the entity region 11, which includes a core layer and a cladding outside the core layer. A refractive index difference formed between the core layer and the cladding restricts an optical field transmitted by the region A. The region B is a uniform optical medium which does not restrict the optical field, and divergent propagation of the optical field in the region B is isotropic.

The coupler provided in the embodiment of the present disclosure connects the first optical waveguide to the second optical waveguide, and the size of the first end of the entity region matches the size of the end plane of the first optical waveguide, the second end of the entity region matches the size of the end plane of the second end of the first waveguide grating, and the size of the first end of the first waveguide grating matches the size of the end plane of the second optical waveguide; because the width of the entity region renders the linear gradient from the first end of the entity region to the second end of the entity region, the entity region of the coupler may adjust size of a light spot output by the first optical waveguide to dose to size of a light spot of the second optical waveguide along a horizontal direction, and a refraction index difference between the core layer and cladding in the core region of the first waveguide grating restricts light transmission; however, because the gap region of the first waveguide grating is a uniform medium, light may propagate divergently, that is, adjusting the size of the light spot output by the first optical waveguide in horizontal and vertical directions to close to the size of the light spot of the second optical waveguide. As a result, insertion loss during coupling optical waveguide signals at two sides of the coupler may be significantly reduced.

Meanwhile, the width of the entity region 11 renders the linear gradient from the first end 111 of the entity region 11 to the second end 112 of the entity region 11. As shown in FIG. 2, the first optical waveguide 2 is a single-mode optical waveguide, and the second optical waveguide 3 is a fiber. Because a right end of the entity region 11 is connected to the single-mode optical waveguide, after the optical field enters the entity region 11 from the single-mode optical waveguide, and because the width of the entity region 11 gradually increases, the restriction on the optical field becomes gradually weaker along the horizontal direction, and the light spot size becomes gradually larger along the horizontal direction; however, thickness of the entity region 11 is the same as that of the first optical waveguide 2, so the light spot size does not change along the vertical direction. Therefore, a function of the entity region 11 is extending the light spot of the single-mode optical waveguide along the horizontal direction to close to the size of the light spot of the fiber. As shown in FIG. 2, in a common case, a cross-section size of the single-mode optical waveguide in the optical waveguide chip is usually smaller than a cross-section size of the fiber, and it may be not only understood that cross-section area of the single-mode optical waveguide is smaller than cross section area of the fiber but also understood that a cross-section shape of the single-mode optical waveguide is located in a round cross-section shape of the fiber. Therefore, an example is provided, the width of the entity region 11 decreases linearly from the first end 111 of the entity region 11 to the second end 112 of the entity region 111, as SW>NW shown in FIG. 2.

In addition, it may be understood that the first waveguide grating includes at least one grating period, but because one grating period has limited ability to adjust the light spot size, a preferred manner is provided: the first waveguide grating 12 includes grating periods of a set quantity, and the core layer and the gap region of each grating period are arranged parallel. As shown in FIG. 2, in each grating period of the first waveguide grating 12, a length ratio between the core region and the gap region (that is, the duty cycle of the first waveguide grating) renders a linear gradient from the first end 121 of the first waveguide grating 12 to the second end 122 of the first waveguide grating 12, where the duty cycle of the grating period refers to a proportion of length of the core layer in a grating period to the grating period. The foregoing does not limit length of each grating period in the first waveguide grating 12, but because the grating is usually manufactured using an etching process, and in an exposure process, manufacturing gratings of different periods requires to design shadow masks of different periods, and thus design complexity is increase. In order to reduce the design complexity, a preferred solution is that lengths of each grating period of the first waveguide grating 12 are equal.

For example, a left end of the first waveguide grating 12 is connected to the second optical waveguide 3, and the right end of the first waveguide grating 12 is connected to the entity region 11 of the coupler. The first waveguide grating 12 consists of several grating periods. The length ratio between the core region and the gap region in each grating period of the first waveguide grating 12 increases linearly from the first end of the first waveguide grating to the second end of the first waveguide grating, for example, there are 15 grating periods in FIG. 3. In an entire first waveguide grating 12, widths of each grating period are the same. The widths of each grating period are SW. Lengths of each grating period are also the same. The lengths of each grating period are T. Duty cycles of each grating period are different, that is, values of A/T are different. For example, the duty cycle of the period of the right end of the first waveguide grating 12 is maximum and the duty cycle of the period of the left end of the first waveguide grating 12 is minimum. The duty cycle of each period decreases linearly from the right to the left. In the first waveguide grating 12 of the coupler, when the optical field is propagated in a propagation region (that is, as shown in FIG. 3, the region A in each period) of the core layer, because the waveguide has a core layer, the optical field is not only restricted in the horizontal direction but also restricted in the vertical direction. When the optical field is propagated in a propagation region (that is, the gap region of each period) of a coreless region, the optical field is actually propagated in a uniform medium without any restriction. In a propagation region having the core layer, the optical field distribution thereof may be approximate to Gaussian distribution; however, when propagated in a uniform medium, a Gaussian distribution field is gradually divergent, that is, the light spot of the optical field becomes gradually larger both in the horizontal direction and the vertical direction. In design optimization, extension and shrink of the spot light in the vertical direction is controlled by controlling changes of the duty cycles of each grating period. In the entire first waveguide grating 12 of the coupler, the propagation of the optical field goes through periodic restriction regions and non-restriction regions. Intermittent non-restriction makes the light spot extend both in the vertical direction and the horizontal direction. For example, the duty cycle of each grating period of the first waveguide grating 12 increases linearly from the first end 121 of the first waveguide grating 12 to the second end 122 of the first waveguide grating 12, where lengths of each grating period of the first waveguide grating 12 are equal, and because the duty cycle changes from large to small, an extension range of the light spot in the vertical direction changes from large to small, and the closer the light spot to the second optical waveguide 3, the extension range is larger. However, in the entire coupler, an extension range of the light spot size in the horizontal direction includes an extension range of the light spot size in the horizontal direction in the entity region 11 and an extension range of the light spot size in the horizontal direction in a non-restriction region of the entire first waveguide grating 12.

Figure 4A:
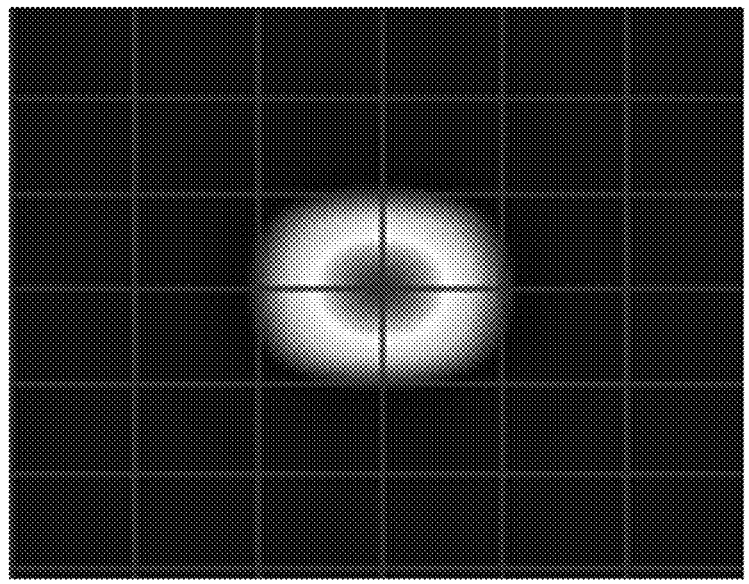
FIG. 4a to FIG. 4g are optical field distribution simulation diagrams according to embodiments of the present disclosure.
Figure 4B:
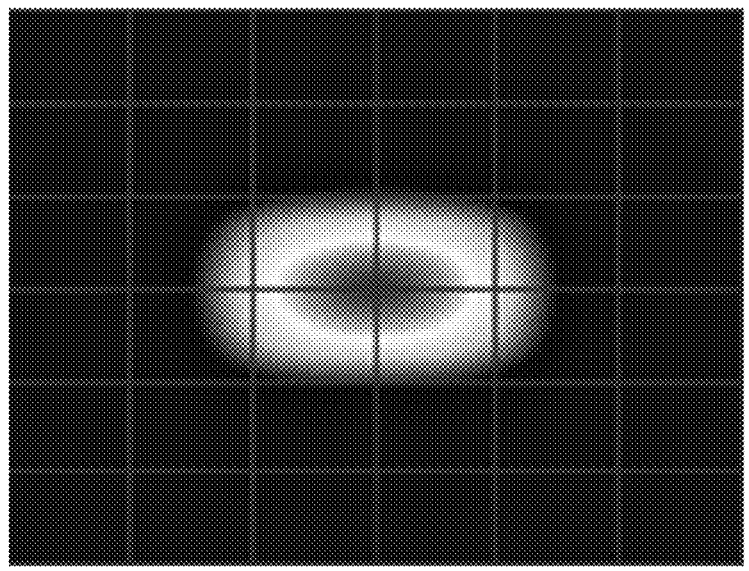
Figure 4C:
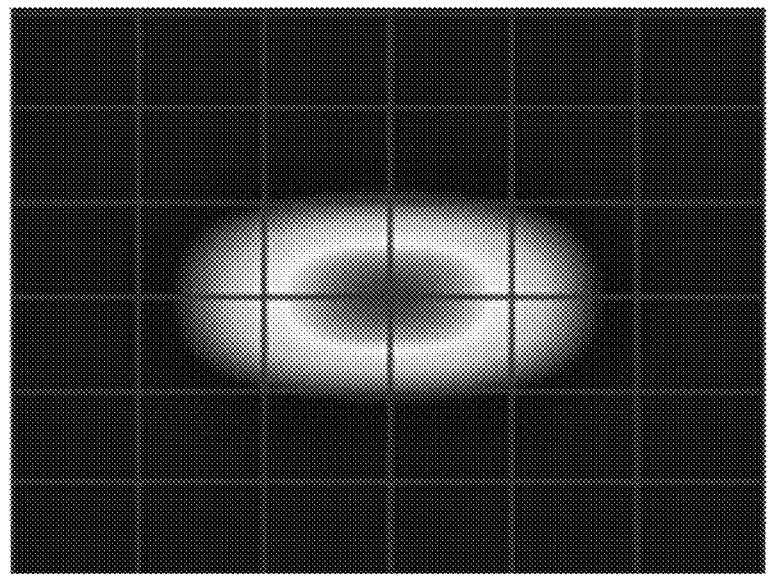
Figure 4D:
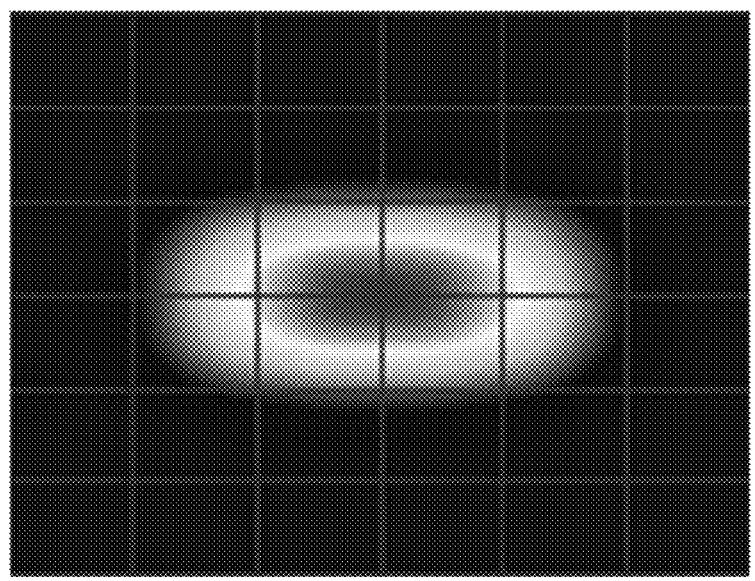
Figure 4E:
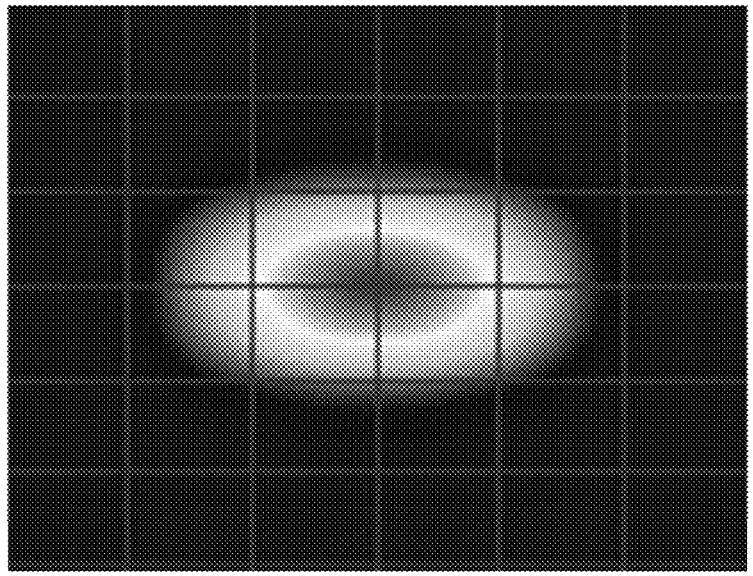
Figure 4F:
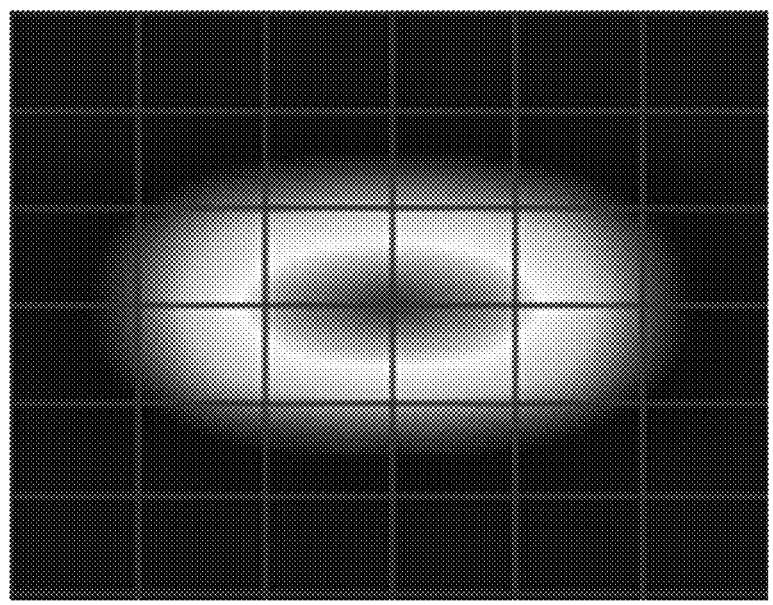
Figure 4G:
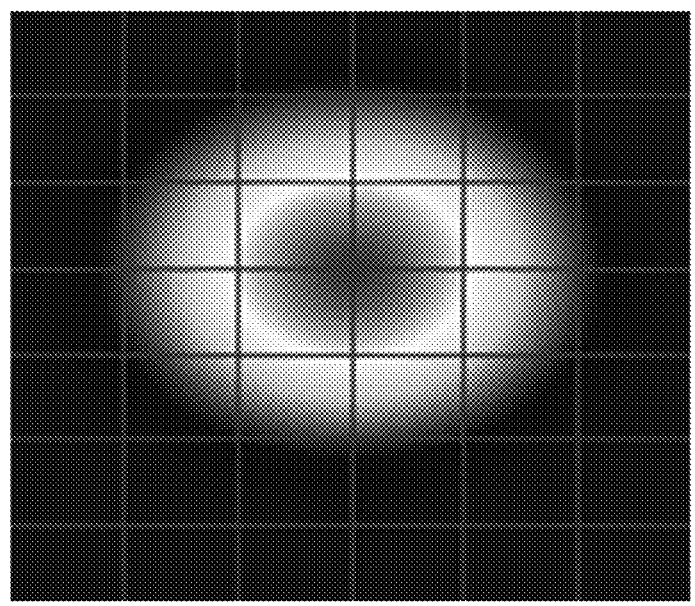

FIG. 4a to FIG. 4g are optical field distribution simulation diagrams according to embodiments of the present disclosure. FIG. 4a shows an optical field distribution diagram of a single-mode optical waveguide. FIG. 4g shows a distribution diagram of an optical field at a fiber after the optical field passes through the fiber to a waveguide coupler. FIGS. 4b and 4c show distribution diagrams of optical fields at two sampling propagation distances in an entity region 11 inside a coupler. Compared with FIG. 4a, size of a light spot is extended along a horizontal direction after the optical field passes through the entity region 11. FIG. 4d, FIG. 4e, and FIG. 4f show distribution diagrams of optical fields at three sampling propagation distances in a first waveguide grating 12 inside a coupler. Compared with FIG. 4a, FIG. 4b, and FIG. 4c, it is obviously that, after the optical field passes through the first waveguide grating 12, an extension range of the light spot size in a vertical direction changes from small to large. In addition, the light spot size along the horizontal direction is also slightly extended. In addition, with reference to FIG. 4a to FIG. 4g, the entity region 11 only extends the light spot size along the horizontal direction, so after a light beam output by the single-mode optical waveguide passes through the entity region 11, the light spot is an ellipse-like shape, and diameter of the light spot in the vertical direction is smaller than diameter of the light spot in the horizontal direction; therefore, an divergence angle of the light beam in the vertical direction is larger than an divergence angle of the light beam in the horizontal direction. After the light beam enters the first waveguide grating 12, divergence speed of the light spot in the vertical direction is faster than that in the horizontal direction, so after the light beam enters the first waveguide grating 12, the light spot gradually changes from ellipse-like to round-like, and of course, because when the light beam passes through the first waveguide grating 12, the diameter of the light spot in the vertical direction becomes gradually larger, and the divergence angle of the light beam in the vertical direction becomes gradually smaller. Therefore, the divergence speed of the light beam in the vertical direction becomes gradually slower, and the divergence angles and divergence speeds in the vertical direction and horizontal direction tend to become the same, and the light spot size is gradually close to the light spot size of a fiber mode field. However, after the light beam passes through the first waveguide grating 12, if the light spot size of the light beam is closer to the light spot size of the fiber mode field, insertion loss caused during coupling the optical waveguide and the fiber is lower.

Figure 5:
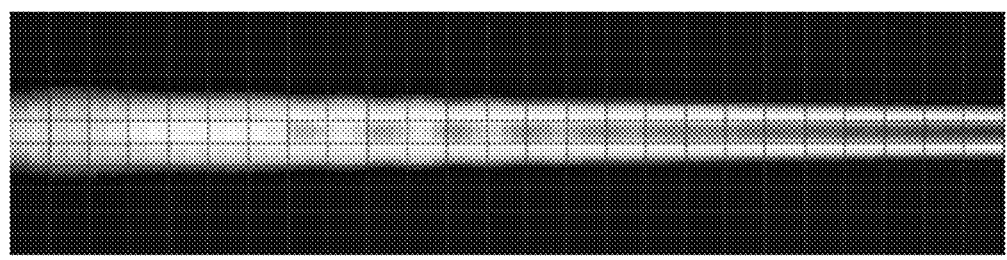
FIG. 5 is a schematic simulation diagram of optical field propagation inside a coupler according to an embodiment of the present disclosure.

FIG. 5 shows an optical field propagation simulation diagram inside a coupler from an entire fiber to an optical waveguide. Rightmost side of FIG. 5 is a connected single-mode optical waveguide, and leftmost side of FIG. 5 is a connected fiber. It can be seen from FIG. 5 that, the optical field is propagated in a single-mode form in an entity region 11 all the time, and because a first waveguide grating 12 has a gap region, the optical field is propagated periodically in a restriction form and a non-restriction form.

Specifically, in the foregoing embodiment, insertion loss between a fiber and a single-mode optical waveguide is mainly caused by different refraction index differences between core layers and claddings of the fiber and the single-mode optical waveguide. When a light beam is propagated in an optical waveguide medium, if the refraction index difference is reduced, size of a light spot of an optical mode field increases. However, the refraction index difference of the single-mode optical waveguide is much larger than the refraction index difference of the fiber. Therefore, as long as the difference between the refraction index differences of the single-mode optical waveguide and the fiber is reduced, the insertion loss between the single-mode optical waveguide and the fiber may be reduced. The first waveguide grating 12 of the coupler just plays a role in reducing the difference between the refraction index differences of the single-mode optical waveguide and the fiber. Specifically, in each grating period of the first waveguide grating 12, an effective refraction index of a core region is equal to an effective refraction index of the entity region 11, and an effective refraction index of the gap region is a refraction index of the cladding of the single-mode optical waveguide. An effective refraction index of a grating period is a weighted average value of the effective refraction index of the core region and the effective refraction index of the gap region, and the result thereof is between the effective refraction index of the entity region 11 and the effective refraction index of the fiber. A smaller duty cycle of a grating period indicates that the effective refraction index of the grating period is closer to the effective refraction index of the fiber. In the present disclosure, the duty cycle of each grating period in a grating region changes from large to small, so that the effective refraction index of the first waveguide grating 12 of the entire coupler is close to the effective refraction index of the fiber, and thereby reducing the insertion loss. For the size of the light spot, when the light is propagated in the core region of the grating, because the refraction difference between the core layer and the cladding exists, the light may be better restricted to propagate in the core region; while when the light is propagated in the gap region, because the light is propagated in a uniform medium, the light would propagate divergently. In one period of the grating region, a smaller duty cycle of the period indicates that the period has a loose restriction on light propagation, so that the light spot tends to propagate divergently, that is, the size of the light spot is closer to the size of the light spot size of fiber eigenmode. By optimizing the number of grating periods, period lengths, and start and end values of duty cycles of the first waveguide grating 12, the insertion loss between the entire fiber and the waveguide coupler is significantly reduced. In a design of the present disclosure, the coupler is manufactured using a planar process, and no new requirement is raised for the manufacturing process of a planar optical waveguide. Therefore, the design is more valuable.

Figure 6:
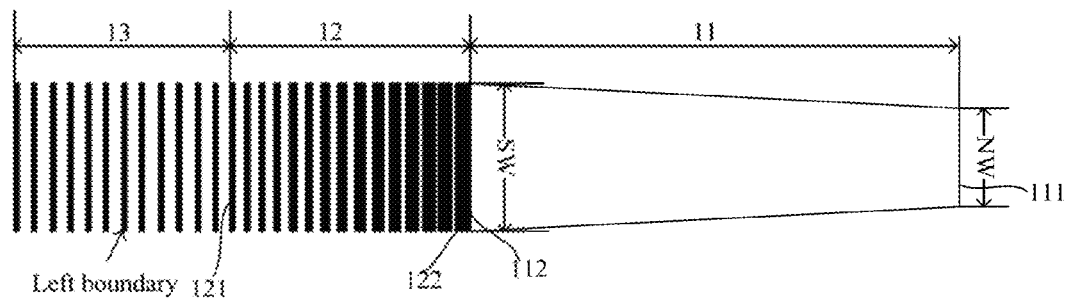
FIG. 6 is a schematic structural diagram of a coupler according to another embodiment of the present disclosure.

Further, as shown in FIG. 6, the coupler according to the present disclosure further includes: a second waveguide grating 13, where the second waveguide grating 13 is disposed between a first end 121 of a first waveguide grating 12 and a second optical waveguide 3.

Lengths of each grating period of the second waveguide grating 13 are equal and duty cycles of each grating period of the second waveguide grating are equal. Optionally, length of the second waveguide grating 13 is longer than or equal to a maximum error range of precision of a grating grinding process.

A planar optical waveguide chip is obtained by performing two procedures cutting and grinding on a wafer. The sequence is cutting first and then grinding. After the grinding, a planar optical waveguide satisfying a design size and a coupler coupled to the planar optical waveguide are obtained. In an actual operation, because the grinding is precision-limited, it is impossible to obtain a planar optical waveguide chip with a size exactly the same as the design size. Connections between the fiber and the coupler are exactly located at an input end and an output end of the planar optical waveguide chip, and a grinding error would impact performance of the fiber and the coupler. For example, if the grinding is excessive, several period gratings of the first waveguide optical grating region 12 of the coupler are grinded, which would impact the insertion loss of the coupler; and if the grinding is inadequate, the first waveguide grating 12 of the coupler cannot be directly connected to the fiber, which seriously impacts efficiency of coupling the fiber and the coupler.

To solve the foregoing problem, as shown in FIG. 6, a schematic structural diagram of a coupler design insensitive to grinding precision is provided. The coupler further includes a second waveguide grating 13 disposed between the first end 121 of the first waveguide grating 12 and the fiber 3. The second waveguide grating 13 consists of several grating periods, where lengths, duty cycles, and waveguide widths of each grating period are the same respectively. Total length of the second waveguide grating 13 is decided by the grinding error. During designation of the planar optical waveguide chip, a left boundary (a left boundary shown in FIG. 6) of the entire chip is disposed at a center location of the second waveguide grating 13. Based on such a design concept, the total length of the second waveguide grating 13 is equal to an absolute value of a grinding error range. For example, if the grinding error is +/−100 micron, total length of a uniform grating region is 200 micron. On the design aspect, it should be ensured that the length of the second waveguide grating 13 is longer than or equal to the maximum error range of the precision of the grating grinding process.

Figure 7:
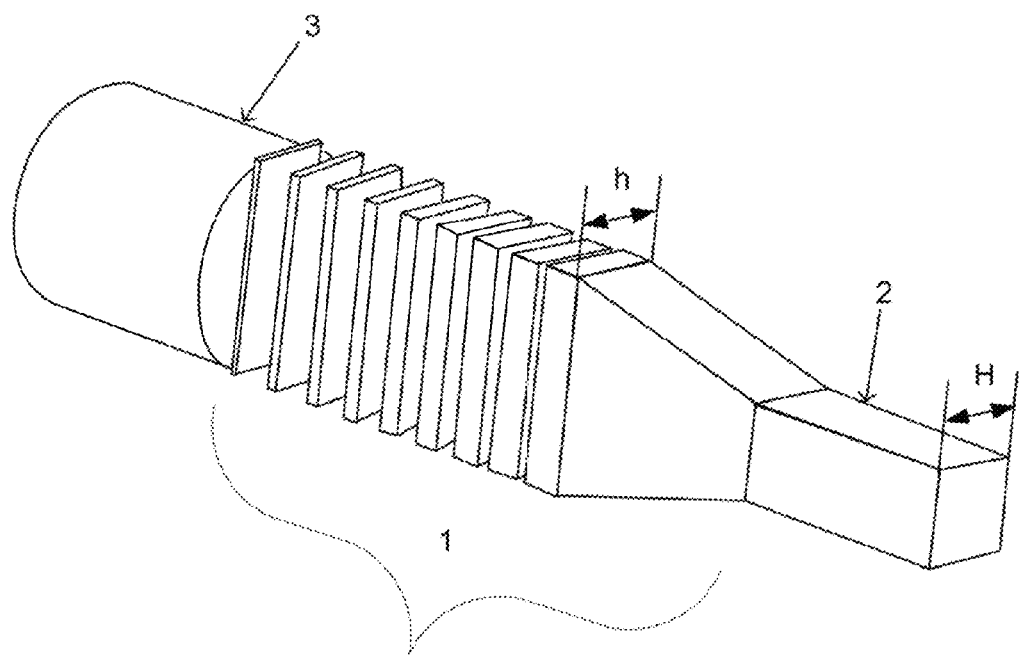
FIG. 7 is a schematic structural diagram of a coupler according to still another embodiment of the present disclosure.

Waveguide width of the second waveguide grating 13 is the same as width of the first waveguide grating 12, that is, SW. The grating period and duty cycle of the second waveguide grating 13 may minimize the impact of the grinding error on insertion loss between the fiber and the coupler. An optimum design of the second waveguide grating 13 is that after the grinding, no matter how many uniform grating periods are left, after passing through the number of left uniform grating periods, the insertion loss between the fiber and the coupler remains the same. Specifically, the following three situations are included: (1) grinding with zero error, that is, when the left boundary of the planar optical waveguide chip is exactly a designed value, half length of the second waveguide grating 12 is grinded; (2) grinding excessively and reaching a maximum value of grinding precision, that is, after the grinding, when a left boundary of the planar optical waveguide chip is exactly located between the second waveguide grating 13 and the first end 121 of the first waveguide grating 12, the second waveguide grating 13 is all grinded; and (3) grinding inadequately and reaching the maximum value of the grinding precision, that is, after the grinding, when the left boundary of the planar optical waveguide chip is exactly at a left end of the second waveguide grating 13, the second waveguide grating 13 is all reserved. No matter in which situation of the foregoing three situations, the insertion between the entire fiber and the waveguide coupler changes a little. Additionally and optically, as shown in FIG. 7, thickness h everywhere of the coupler is equal to thickness H of the first optical waveguide 2. Limited to the manufacturing process of the optical waveguide chip, the coupler is manufactured on a same wafer with the optical waveguide by using a planar process, and the thickness of the coupler matches the thickness of the first optical waveguide, and because different thicknesses of the coupler and the optical waveguide causes new insertion loss, no special processing is required.

Figure 8:
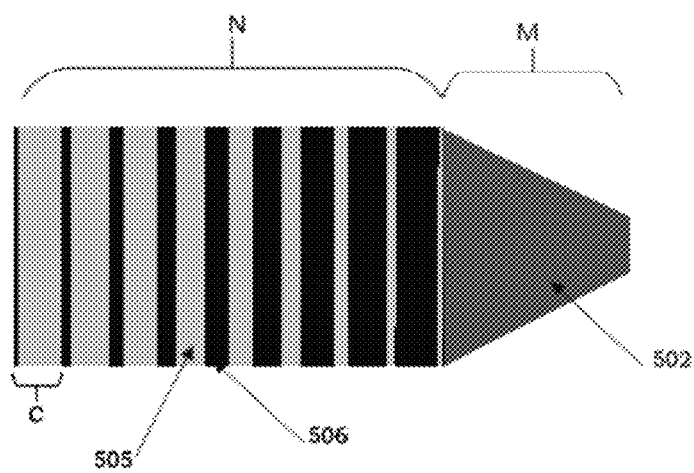
FIG. 8 is a schematic structural diagram of a coupler according to yet another embodiment of the present disclosure.

In addition, some embodiments of the present disclosure also provide a coupler. As shown in FIG. 8, the coupler according to the embodiments of the present disclosure includes a first light spot zoom region M and a second light spot zoom region N.

The first light spot zoom region M includes a first medium (not shown in FIG. 8) and a second medium 502 encapsulating the first medium.

The first medium is located inside the first light spot zoom region, and is encapsulated by the second medium. Therefore, FIG. 8 cannot show the first medium in a planar diagram.

Figure 9:
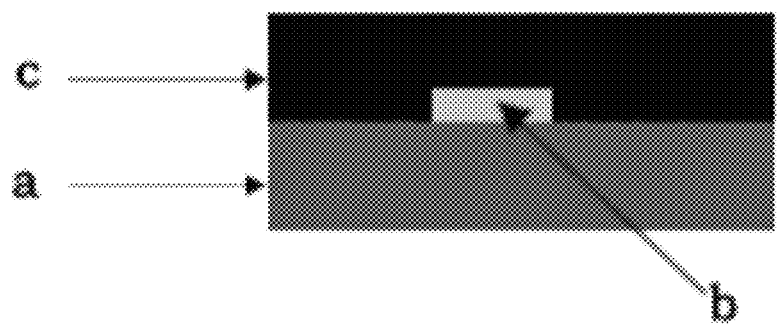
FIG. 9 is a manufacturing structural diagram of a coupler according to still yet another embodiment of the present disclosure.

Specifically, the second medium may include at least two mediums. The second medium may be manufactured using a planar optical waveguide. As shown in FIG. 9, the second medium manufactured using the planar optical waveguide includes two mediums a and c.

A refraction index of the first medium is larger than a refraction index of the second medium.

When the coupler according to the embodiment of the present disclosure is used to perform light transmission, specifically, when light is transmitted in the first light spot zoom region, the light enters the first medium first, and when the light enters the second medium from the first medium, by using a light total reflection principle between mediums of different refraction indexes, the light is totally reflected at an intersecting face between the first medium and the second medium, and the light will not be refracted into the second medium, so that the light continues to be transmitted in the first medium.

The first medium includes a square surface and a rectangular surface. The light enters or goes out from the first medium through the square surface and the rectangular surface respectively. Area of the rectangular surface is larger than area of the square surface.

Specifically, the first medium may be a trapezoid, and the rectangular surface is parallel with the square surface. The light may be propagated between the rectangular surface and the square surface paralleled with each other.

A coupler according to the embodiment of the present disclosure is manufactured using the planar optical waveguide. FIG. 9 is a manufacturing structural diagram of a planar optical waveguide. As shown in FIG. 9, in the manufacturing process, a layer of material a with a relatively small refraction index is deposited and grow on a plane substrate first, and then a layer of material b with a relatively large refraction index is deposited and grow on the material a. The material a constitutes a lower cladding of the optical waveguide, and the material b constitutes a core layer of the planar optical waveguide. The material b is etched to form a shape required by the optical waveguide, and then a layer of material c with a relatively small refraction index is overlapped on the material b, and the material c constitute a upper cladding of the optical waveguide. The material c and the material b may be the same material. The material a and the material c form a cladding encapsulating the material b.

Because the planar optical waveguide is manufactured using a planar optical waveguide, a boundary of a cross-section shape thereof must be a straight line. In an actual use process, the planar optical waveguide is a cylinder, and a cross-section thereof is a polygon. Common cross-section shapes are square, rectangular, and trapezoid. The coupler according to the embodiment of the present disclosure is manufactured using the planar optical waveguide, so the first medium thereof includes a square surface and a rectangular surface.

When the planar optical waveguide is used to perform light transmission, light enters the core layer first, and when the light is transmitted from the core layer to the upper cladding or the lower cladding, because a refraction index of the core layer is larger than refraction indexes of the upper cladding and the lower cladding, the light is total reflected at an intersecting face between the core layer and the upper cladding or an intersecting face between the core layer and the lower cladding, then the light is restricted to be propagated in the core layer of the optical waveguide.

The light is transmitted only in the first medium, and when cross-sectioning on the first medium is performed at different locations in a transmission direction perpendicular to the light, different cross-sections are obtained. The light enters and goes out from the first medium by passing through the square surface and the rectangular surface, and the first medium includes a square surface and the rectangular surface, and because area of the rectangular surface is larger than area of the square surface, area of a light spot of the light enters and goes out from the square surface is smaller than area of a light spot of the light enters and goes out from the rectangular surface.

A first light spot zoom region and a second light spot zoom region are manufactured using the planar optical waveguide. The first light spot zoom region and the second light spot zoom region may be molded integrally, or may be manufactured separately. It is difficult to seamlessly connect the separately manufactured first light spot zoom region to the second light spot region, the light is divergent from a gap, and light propagation efficiency is impacted, and thus an integrated molding technology is usually used to fabricate the first light spot zoom region and the second light spot zoom region, so that no gap exists between the first light spot zoom region and the second light spot zoom region.

The second light spot zoom region is located at one side of the rectangular surface of the first medium.

Because a light propagation direction is reversible, the light enters the second light spot zoom region from the first light spot zoom region is a process of zooming in the light spot, and the light enters the first light spot zoom region from the second light spot zoom region is a process of zooming out the light spot. Therefore, the coupler is used to implement enlarging or shrinking the light spot according to an actual process requirement on light.

The second light spot zoom region is located at one side of the rectangular surface of the first medium, and the second light spot zoom region is located at one side of the first light spot zoom region. A case that the light enters the second light spot zoom region from the first light spot zoom region is used as an example, and according to the transmission direction of the light, the first light spot zoom region implements zooming in the light spot, and the second light spot zoom region continues to zoom in the light spot based on the first light spot zoom region, so the second light spot zoom region is not only located at one side of the first light spot zoom region, but also close to the rectangular surface of the first medium, and the second light spot zoom region receives light transmitted from the rectangular surface of the first medium.

The second light spot zoom region includes a mixture medium and a uniform medium, and the mixture medium and the uniform medium are arranged spaced apart from each other.

The mixture medium includes a third medium and a fourth medium encapsulating the third medium.

A refraction index of the third medium is larger than a refraction index of the fourth medium.

The mixture medium includes a third medium and a fourth medium encapsulating the third medium specifically means that the mixture medium includes at least two mediums.

The mixture medium may be manufactured using the planar optical waveguide. As shown in FIG. 9, a core layer b of the mixture medium manufactured using the planar optical waveguide is encapsulated by two mediums a and c.

When the light enters the fourth medium from the third medium, by using a light total reflection principle between mediums of different refraction indexes, the light is totally reflected at an intersecting face between the third medium and the fourth medium, and the light will not be refracted into the fourth medium, so that the light continues to be transmitted in the third medium.

The uniform medium and the mixture medium are arranged spaced apart from each other. The light enters the mixture medium after passing through the uniform medium, and the light enters the uniform medium after passing through the mixture medium.

After transmitting from the rectangular surface of the first medium, the light may enter the uniform medium or mixture medium first.

There may be one or more mixture mediums; and there may be one or more uniform mediums.

Thickness of the mixture medium changes regularly. Specifically, the thickness of the mixture medium may increase towards the first light spot zoom region direction in turn, and the thickness of the mixture medium may also increase back to the first light spot zoom region in turn.

Thickness of the uniform medium changes regularly. The thickness of the uniform medium may decrease towards the first light spot zoom region direction in turn, and the thickness of the mixture medium may also decrease back to the first light spot zoom region in turn.

Increasing of the thickness of the mixture medium in turn may be a linear change or a non-linear change; and decreasing of the thickness of the uniform medium in turn may be a linear change or a non-linear change.

During a process that the light is propagated in the mixture medium and the uniform medium in turn, the thickness of the mixture medium changes regularly in turn, and a degree of an impact of the mixture medium on the light spot may be precisely controlled; and the thickness of the uniform medium changes regularly in turn, and a degree of an impact of the uniform medium on the light spot is precisely controlled.

In some embodiments, the first light spot zoom region M in the foregoing embodiment may be equivalent to the entity region 11 in the foregoing embodiments, and the second light spot zoom region N may be equivalent to the first waveguide grating 12.

In some embodiments, the thickness of the uniform medium and light wavelength are at a same order of magnitude.

The thickness of the mixture medium and the light wavelength are at a same order of magnitude.

The order of magnitude refers to a series of powers of 10, that is, a ratio between two adjacent orders of magnitude is 10. When a difference between the light wavelength and a medium transmitting the light is several orders of magnitude, a principle of geometrical optics is usually used to parse an impact of the medium on the light propagation; while when the light wavelength and the medium transmitting the light are at a same order of magnitude, an electromagnetic wave characteristic of the light has a significant effect on parsing the impact of the medium on the light propagation, which is greatly limited in understanding from the principle of geometrical optics.

In the uniform medium, the light is divergent stereoscopically, which decreases energy of light around a primary optical axis. When a propagation path of the light in the uniform medium is relatively long, excessive light divergence makes the light cannot form an energy response that meet a signal transmission requirement on a light detector.

Generally, the thickness of the uniform medium and the light wavelength are at a same order of magnitude, so the light divergence in the uniform medium will not cause the foregoing problem.

By using the coupler provided in the embodiment of the present disclosure, light of which the light spot is round enters a first medium from the square surface; a second encapsulates the first medium, and a refraction index of the second medium is smaller than a refraction index of the first medium, and the light may be kept to be propagated in the first medium by using light total reflection; when the light goes out from the rectangular surface of the first medium, the light is restricted by the rectangular surface, and the shape of the light spot becomes an ellipse; by comparing light in a long axis direction and light in a short axis direction, the light in the short axis direction has a larger divergence angle; and when the light continues to enter the second light spot zoom region, the mixture medium of the second light spot zoom region restricts light divergence, and the uniform medium of the second light spot zoom region does not restrict the light divergence, and during a process that the light passes through the mixture medium and the uniform medium arranged spaced apart from each other, the light spot shape changes from ellipse to round.

The light enters the first light spot zoom region from the square surface and goes out from the rectangular surface, and zooming in and out the shape of the light spot is implemented in the first light spot zoom region. In the zooming in and out process, the light divergence angle is changed, and the shape of the light spot of the light goes out from the rectangular surface is ellipse, so the light in the long axis direction of the ellipse is relatively large and the light in the short axis direction of the ellipse is relatively large.

The divergence angle embodies a degree that the light propagation direction deviates from a light axis. A larger divergence angle indicates a larger degree that the light propagation direction deviates from the light axis.

The light spot of the light goes out from the rectangular surface of the first light spot zoom region is an ellipse, and divergence angles of the light are different. If the light continues to propagate in the uniform medium, because the divergence angle of the light in the short axis of the ellipse is relatively large, after the light propagates a certain distance, the ellipse light spot may changes to the round light spot; however, divergence speed of the light propagating in the uniform medium is relatively fast, when the light spot changes from ellipse to round, area of the round light spot is too large, which results in too small light strength per unit of the light spot area. Too small light strength is beyond sensibility of the light detector, so the light cannot be used for signal transmission currently.

The light enters the second light spot zoom region from the first light spot zoom region, and in the second light spot zoom region, the mixture medium and the uniform medium are arranged spaced apart from each other, and the mixture medium includes a third medium and a fourth medium encapsulating the third medium, and a refraction index of the third medium is larger than a refraction index of the fourth medium. When the light enters the mixture medium, the mixture medium restricts the light divergence angle and divergence speed, and when the light enters the uniform medium, the uniform medium does not restrict the light divergence angle and divergence speed, so when the light passes through the mixture medium and the uniform medium arranged spaced apart from each other, the light is restricted in the mixture medium and is not restricted in the uniform medium, the ellipse light spot gradually changes to the round light spot while avoiding rapid divergence.

Figure 10:
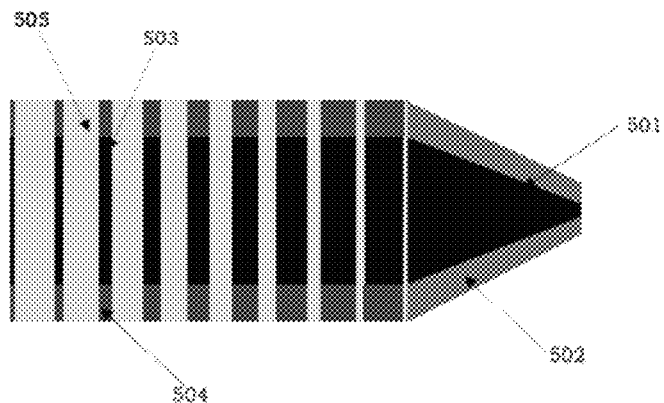
FIG. 10 is a cross-sectional diagram of a coupler according to some embodiments of the present disclosure.

FIG. 10 is a cross-sectional diagram of a coupler according to another embodiment of the present disclosure. As shown in FIG. 10, cross-sectioning on the coupler is performed along a light propagation direction perpendicular to light, and a first light spot zoom region of the coupler includes a first medium 501 and a second medium 502 encapsulating the first medium 501.

The first medium 501 is a trapezoid. When the light is transmitted between two parallel square surfaces of the trapezoid, a light spot may be zoomed in or zoomed out.

In a second light spot zoom region, a mixture medium includes a third medium 503 and a fourth medium 504, and the fourth medium 504 encapsulating the third medium 503. Two sides of the mixture medium are uniform mediums 505, and two sides of a uniform medium 505 are mixture mediums.

Figure 11:
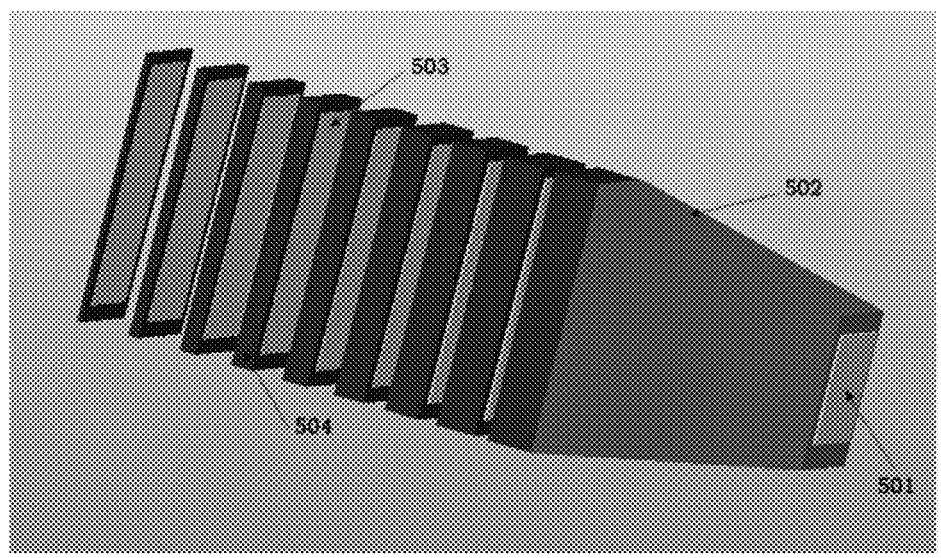
FIG. 11 is a stereogram of a coupler according to another embodiment of the present disclosure.

FIG. 11 is a stereogram of a coupler according to another embodiment of the present disclosure. For demonstration purposes, a second light spot zoom region only shows mixture mediums, but uniform mediums between the mixture mediums are not shown. As shown in FIG. 11, in the mixture medium, a third medium 503 is encapsulated by a fourth medium 504; and in a first light spot zoom region, a first medium 501 is encapsulated by a second medium 502.

In addition, the embodiment of the present disclosure also provides an optical waveguide chip. As shown in FIG. 1, the optical waveguide chip includes a coupler and a first optical waveguide coupled to the coupler, where the coupler in the optical waveguide chip may have the structure mentioned in the foregoing embodiment, and coupling between the coupler and the first optical waveguide may use the coupling manner mentioned in the foregoing embodiment.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

What is claimed is:

1. A coupler for connecting a first optical waveguide to a second optical waveguide, the coupler comprising:
   an entity region, comprising:
      a first end of the entity region configured to be coupled to a first optical waveguide, a second end of the entity region, and
width of the entity region gradually changes from the first end of the entity region to the second end of the entity region; and
a first waveguide grating, comprising:
a first end of the first waveguide grating configured to be coupled to a second optical waveguide, wherein the first end of the first waveguide grating is parallel to a grating plane of each grating period of the first waveguide grating; and
a second end of the first waveguide grating coupled to the second end of the entity region.

2. The coupler according to claim 1, wherein:
a first size difference between the first end of the entity region and an end plane of the first optical waveguide is within a first preset range;
a second size difference between the second end of the entity region and the second end of the first waveguide grating is within a second preset range; and
a third size difference between the first end of the first waveguide grating and an end plane of the second optical waveguide is within a third preset range.

3. The coupler according to claim 1, wherein:
when the second optical waveguide is a round fiber, width of the first end of the first waveguide grating is the same as a diameter of the round fiber.

4. The coupler according to claim 1, wherein:
the width of the entity region renders a linear gradient from the first end of the entity region to the second end of the entity region.

5. The coupler according to claim 1, wherein:
the first waveguide grating comprises one or more grating periods; and
each grating period of the first waveguide grating comprises a gap region and a core region; and
a length ratio between the core region and the gap region in each grating period of the first waveguide grating gradually changes from the first end of the first waveguide grating to the second end of the first waveguide grating.

6. The coupler according to claim 5, wherein:
the length ratio between the core region and the gap region in each grating period of the first waveguide grating renders a linear gradient from the first end of the first waveguide grating to the second end of the first waveguide grating.

7. The coupler according to claim 5, wherein:
the length ratio between the core region and the gap region in each grating period of the first waveguide grating increases from the first end of the first waveguide grating to the second end of the first waveguide grating.

8. The coupler according to claim 5, wherein:
the gap region in each grating period of the first waveguide grating comprises a uniform light medium; and
the core region in each grating period of the first waveguide grating comprises a core layer and a cladding enclosing the core layer.

9. The coupler according to claim 5, wherein length of each grating period of the first waveguide grating is equal.

10. The coupler according to claim 5, further comprising:
a second waveguide grating disposed between the first end of the first waveguide grating and the second optical waveguide, wherein:
the second waveguide grating comprises one or more grating periods, and
each grating period of the second waveguide grating comprises a gap region and a core region.

11. The coupler according to claim 10, wherein:
length of each grating period of the second waveguide grating is equal, and
length of the core region and the gap region in each grating period of the second waveguide grating is equal.

12. The coupler according to claim 10, wherein:
length of the second waveguide grating is longer than or equal to a maximum error range of precision of a grating grinding process.

13. The coupler according to claim 10, wherein:
thickness of the entity region, the first waveguide grating, and the second waveguide grating is equal to thickness of the first optical waveguide.

14. The coupler according to claim 1, wherein the first waveguide grating is a Bragg grating.

15. An optical waveguide chip, comprising:
a coupler configured to connect a first optical waveguide to a second optical waveguide, the coupler comprising:
an entity region, comprising:
a first end of the entity region configured to be coupled to a first optical waveguide,
a second end of the entity region, and
width of the entity region gradually changes from the first end of the entity region to the second end of the entity region; and
a first waveguide grating, comprising:
a first end of the first waveguide grating configured to be coupled to the second optical waveguide, wherein the first end of the first waveguide grating is parallel to a grating plane of each grating period of the first waveguide grating, and
a second end of the first waveguide grating coupled to the second end of the entity region.

16. The optical waveguide chip according to claim 15, wherein:
a first size difference between the first end of the entity region and an end plane of the first optical waveguide is within a first preset range;
a second size difference between the second end of the entity region and the second end of the first waveguide grating is within a second preset range; and
a third size difference between the first end of the first waveguide grating and an end plane of the second optical waveguide is within a third preset range.

17. The optical waveguide chip according to claim 15, wherein:
when the second optical waveguide is a round fiber, width of the first end of the first waveguide grating is the same as a diameter of the round fiber.

18. The optical waveguide chip according to claim 15, wherein:
the width of the entity region renders a linear gradient from the first end of the entity region to the second end of the entity region.

19. The optical waveguide chip according to claim 15, wherein:
the first waveguide grating comprises one or more grating periods;
each grating period of the first waveguide grating comprises a gap region and a core region; and
a length ratio between the core region and the gap region in each grating period of the first waveguide grating gradually changes from the first end of the first waveguide grating to the second end of the first waveguide grating.

20. The optical waveguide chip according to claim 19, wherein:
the length ratio between the core region and the gap region in each grating period of the first waveguide grating renders a linear gradient from the first end of the first waveguide grating to the second end of the first waveguide grating.

21. The optical waveguide chip according to claim 19, wherein:
the length ratio between the core region and the gap region in each grating period of the first waveguide grating increases from the first end of the first waveguide grating to the second end of the first waveguide grating.

22. The optical waveguide chip according to claim 19, wherein:
the gap region in each grating period of the first waveguide grating comprises a uniform light medium; and
the core region in each grating period of the first waveguide grating comprises a core layer and a cladding enclosing the core layer.

23. The optical waveguide chip according to claim 19, wherein the coupler further comprises:
a second waveguide grating disposed between the first end of the first waveguide grating and the second optical waveguide, wherein:
the second waveguide grating comprises one or more grating periods, and
each grating period of the second waveguide grating comprises a gap region and a core region.

24. The optical waveguide chip according to claim 23, wherein
length of each grating period of the second waveguide grating is equal, and
length of the core region and the gap region in each grating period of the second waveguide grating is equal.

25. The optical waveguide chip according to claim 23, wherein:
length of the second waveguide grating is longer than or equal to a maximum error range of precision of a grating grinding process.

* * * * *